United States Patent Office 2,827,333
Patented Mar. 18, 1958

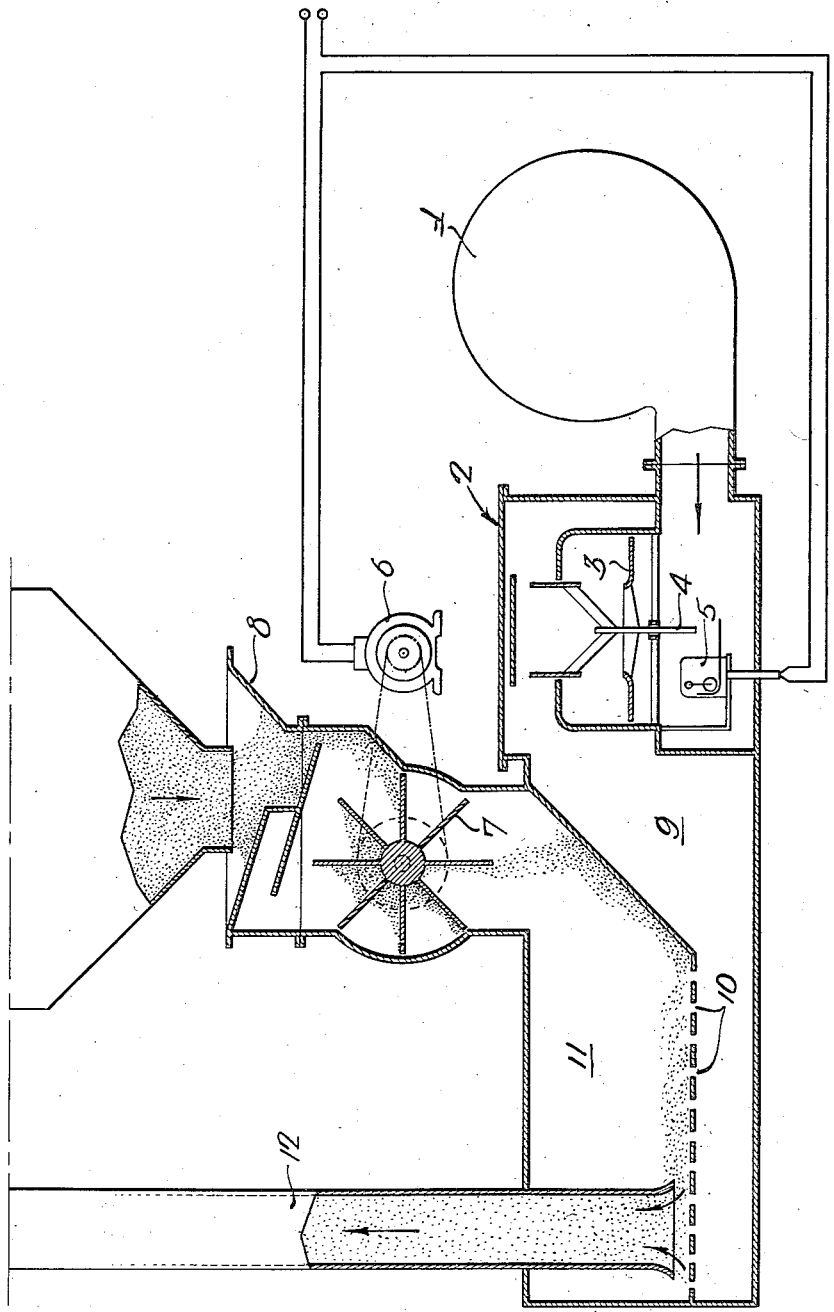

2,827,333

APPARATUS FOR PNEUMATIC TRANSPORTING OF GRAIN OR SIMILAR MATERIAL

Sven Werner Wallin, Jonkoping, Sweden, assignor to Aktiebolaget Svenska Flaktfabriken, Stockholm, Sweden Application July 8, 1955, Serial No. 520,852

Claims priority, application Sweden July 10, 1954

3 Claims. (Cl. 302—36)

The present invention relates to an apparatus for pneumatic transporting of grain or similar material in a pipe system, the material being in known manner fed into and carried by an air current delivered by a fan. It is known that a fan, owing to the shape of its characteristic curve, operates in such a manner that the air quantity varies with the counter-pressure, i. e. the air quantity increases upon a decrease in counter-pressure and vice versa. For common centrifugal fans also the power consumption varies in the same way as the change in air quantity. By using centrifugal fans for pneumatically transporting the air, the quantity and also the power consumption will thus increase upon a decrease in the quantity of material and vice versa. This is change contrary to what is desired. By reason of this increase of the air quantity caused by lowered load, not only will the power consumption increase resulting in increasing running costs and a risk of overloading of the motor, but also there is a risk when transporting of materials, such as grain, of damaging the same by using a high transport velocity. On the other hand, when the air quantity by reason of an increased supply of materials, sinks, there is, of course, a risk of shut-down because of accumulation of material in the conventional feeding device or mixing chamber since the decreasing air quantity results in a continuous decrease in the material discharged from the feeding device. When in this manner the air velocity decreases below a certain value there is also a risk that the material in an uncontrolled manner is accumulated in the pipe lines. It is an object of the present invention to eliminate said drawbacks.

The invested apparatus consists of a feeding device having a mixing chamber suitably provided with sluicing or material supplying means and connected to a pipe-line and a transporting fan. The invention is characterized in that between said mixing chamber and the fan there is arranged a volume governor, for instance a governor in accordance with the Swedish Patent 133,723, which corresponds to my U. S. patent application, Serial No. 384,471 filed September 22, 1953, now Patent No. 2,765,812. The governor is designed to increase the air quantity at increasing counter-pressure towards a predetermined maximum value and to shut off the supply of material by stopping the sluicing means at the position of the floating body of the governor corresponding to a predetermined maximum counter pressure.

The invention will now be more closely described with reference to the accompanying drawing, showing an exemplifying embodiment of the apparatus.

In the drawing 1 designates a centrifugal transporting fan and 2 is a volume governor arranged between the outlet of the fan and a feeding device for the material consisting of a hopper 8, a sluicing wheel 7 with motor 6, a pressure chamber 9, a mixing chamber 11 and an air distributing means 10 arranged between the last mentioned two spaces. 12 designates a transporting pipe leading from the mixing chamber 11. The above mentioned volume governor 2 comprises a floating throttle valve 3, the design of which is made in accordance with the earlier mentioned Swedish Patent No. 133,723 and a guiding rod 4. Adjacent to the rod 4 there is applied a sensitive means 5, for instance a so-called micro-switch arranged to be influenced by said rod in order to shut off the supply of material at a certain predetermined position of the floating body. In the illustrated embodiment of the means 5 acts upon the driving motor 6 for the sluicing wheel 7.

The invention is not limited to the use of volume governors of the described kind as other types of governors can be used within the scope of the invention.

What I claim is:

1. Apparatus for transporting grain or similar material in a gaseous medium, comprising in combination a mixing chamber for the material and the gaseous medium, a conduit for the conveyance of the gaseous medium having therein suspension of the material, a feeding device for supplying said material to the mixing chamber and a fan for supplying the gaseous medium to said mixing chamber and a flow governor between said fan and said conduit to regulate the volumetric flow of the medium to said mixing chamber in accordance with changes in the counter pressure in the conduit, said flow governor comprising a floating throttle valve responsive to said counter pressure and including means for automatically stopping said feeding device operable upon displacement of said floating throttle valve to a position corresponding to a predetermined maximum counter pressure.

2. Apparatus according to claim 1 in which said stopping means consists of a switch having an operator in the path of movement of said floating throttle valve operable by said valve to interrupt the power supply to the feeding device.

3. Apparatus for transporting grain or similar materials in a gaseous medium comprising in combination a mixing chamber for the material and the gaseous medium, a substantially constant speed fan for supplying the gaseous medium to said mixing chamber positioned remote from said mixing chamber, a pressure chamber interconnecting said fan and said mixing chamber, a flow governor in said pressure chamber between said fan and said mixing chamber comprising throttling means responsive to the counter pressure in said mixing chamber and operable to regulate the volumetric flow of the medium to said mixing chamber in accordance with changes in the counter pressure in the mixing chamber, a feeding device for supplying said material to the mixing chamber, and a conduit connected to said mixing chamber for the conveyance of the gaseous medium having therein a suspension of the material from said mixing chamber.

References Cited in the file of this patent

UNITED STATES PATENTS

| | | |
|---|---|---|
| 494,375 | Grigsly | Mar. 28, 1893 |
| 1,450,903 | Newhouse | Apr. 3, 1923 |
| 2,180,379 | Whitfield | Nov. 21, 1939 |
| 2,544,054 | Smith | Mar. 6, 1951 |
| 2,695,815 | Bergstrom | Nov. 30, 1954 |
| 2,727,792 | Bearer | Dec. 20, 1955 |
| 2,765,812 | Wallin | Oct. 9, 1956 |
| 2,770,584 | Ray | Nov. 13, 1956 |

FOREIGN PATENTS

| | | |
|---|---|---|
| 1,074,419 | France | Oct. 5, 1954 |